Feb. 5, 1952

R. A. GAISER 2,584,859

LAMINATED SAFETY GLASS STRUCTURE
AND METHOD OF MAKING THE SAME

Filed Sept. 18, 1948

Inventor
Romey A. Gaiser
By
Nobbe & Swope
Attorneys

Patented Feb. 5, 1952

2,584,859

UNITED STATES PATENT OFFICE 2,584,859

LAMINATED SAFETY GLASS STRUCTURE AND METHOD OF MAKING THE SAME

Romey A. Gaiser, Toledo, Ohio, assignor to Libbey-Owens-Ford Glass Company, Toledo, Ohio, a corporation of Ohio Application September 18, 1948, Serial No. 49,932

7 Claims. (Cl. 201—73)

The present invention relates to laminated safety glass, and more particularly to electrically conducting laminated safety glass.

This application relates to the same general subject matter of invention as the copending application of Romey A. Gaiser et al., Serial Number 216,768, filed March 21, 1951.

Laminated safety glass, per se, is well known in the art and, generally speaking, comprises two or more sheets of glass and one or more interlayers of tough, flexible thermoplastic material all bonded together under the action of heat and pressure to produce a unitary composite structure.

Electrically conducting laminated safety glass is a relatively new development and is similar in construction to ordinary laminated safety glass except that one of the glass sheets has an electrically conducting coating on an inner surface thereof. This electrically conducting coating may, for example, be a clear, transparent film of tin oxide as disclosed in the patent to Harold A. McMaster, No. 2,429,420, dated October 21, 1947, and in order to conduct electricity to and from the coating, electrodes are provided, usually along two opposite marginal portions of the coated glass sheet, and laminated into the unit.

To date such units have found their principal utility as de-icing windows or windshields in automobiles and aircraft, the electrically conducting coating being supplied with electrical energy sufficient to heat the unit to a temperature at which ice or frost will be removed from, or its formation will be prevented on, the surface of the exposed glass sheet.

Now ordinary laminated glass, as produced by present day techniques, is a very stable article even under severe temperature conditions. However, electrically conducting laminated glass presents additional problems due to the fact that, in use, the temperatures at the various surfaces of the unit may be, and usually are, widely divergent. For example, when employed as a window or windshield in automobiles traveling in cold climates, or in airplanes at high altitudes, the glass and plastic surfaces adjoining the electrically conducting coating will be exposed to quite high temperatures, the surface of the unit facing the interior of the vehicle will be exposed to normal room temperatures, and the outside surface of the unit will be exposed to temperatures which may be far below zero.

Because of the difference in coefficient of expansion and contraction between the glass and the plastic interlayer, such temperature differentials have resulted in repeated electrode failure within the unit, usually accompanied by edge separation between the glass and plastic laminations.

However, I have discovered that by providing a suitable separator between the plastic interlayer and the glass sheet at the marginal portion of the unit, and/or in the area of the electrode on the glass, the possibility of electrode failure in such units can be greatly minimized if not entirely eliminated.

It is therefore an aim of this invention to provide a special type of electrically conducting laminated safety glass, and a method of making such a unit, which will eliminate electrode failure in the unit even under the most extreme temperature conditions.

Another object is the provision of a laminated safety glass unit and method of making the same which will eliminate edge separation under such conditions.

Another object is to eliminate injury to a laminated safety glass unit due to expansion and contraction of the plastic interlayer by the provision of a separating layer between contiguous glass and plastic surfaces along marginal portions of the unit.

Another object is to provide such a separating layer which has very slight or no adhesion to the surfaces with which it is in contact.

Another object is the provision of a separating layer which is elastic in nature and remains so under severe temperature conditions.

Still another object is to provide a separating layer of the above character which also extends over the edge of at least one of the laminations.

Other objects and advantages of the invention will become more apparent during the course of the following description, when taken in connection with the accompanying drawings.

In the drawings, wherein like numerals are employed to designate like parts throughout the same:

Figure 1:
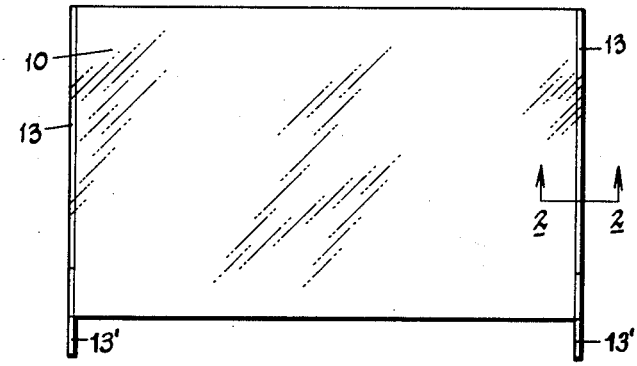
Fig. 1 is a front elevation of an electrically conducting laminated safety glass unit produced in accordance with the invention.
Figure 2:
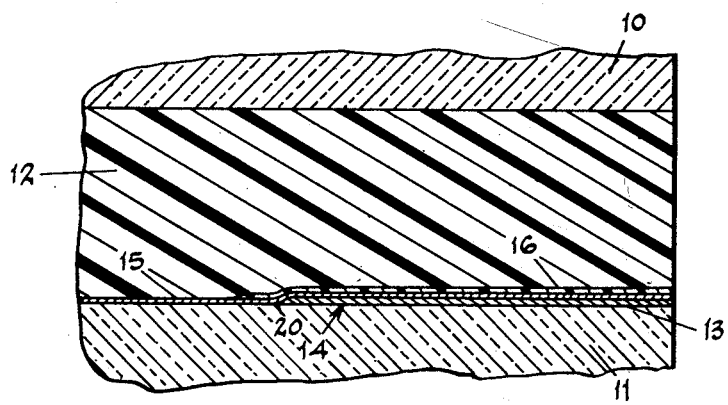
Fig. 2 is a fragmentary sectional view, on a greatly enlarged scale, taken substantially on the line 2—2 in Fig. 1.

Referring now more particularly to the drawings, the unit shown in Figs. 1 and 2 is made up of two sheets of glass 10 and 11, which may be ordinary plate or sheet glass of any desired composition, and one or the other or both of which may be tempered or semitempered, and an interposed layer 12 of a tough flexible thermoplastic material, all bonded together under heat and pressure to provide a composite unitary structure.

In order to render the unit electrically conducting, the plate 11, prior to laminating, is preferably provided with suitable electrodes 13 along two opposite marginal portions of the inner surface 14 thereof, and with an electrically conducting film 15 on this same surface.

A number of different materials may be used for the electrodes 13 and they may be applied to the glass in any convenient manner. For example, electrodes of sprayed copper, sprayed copper alloys, copper foil, silver and platinum fluxes and combinations of these materials have all been used satisfactorily.

To date, the familiar silver bus bar material has been found to be as satisfactory as any, with the possible exception of platinum flux electrodes. The principal advantage of the platinum electrode is that leads can be soldered directly to it, whereas with the silver type bus bars or electrodes, the silver must be electroplated with copper before soldering can be accomplished. The disadvantage of platinum bus bars lies in their high cost.

According to one preferred method of applying the electrodes 13 and the electrically conducting film 15 to the glass sheet 11, the marginal portions of the sheet along its two short sides are first sprayed with an electrically conducting silver flux and then heated to fuse the flux onto the glass. The electrodes or bus bars thus formed may then be electroplated with copper to permit the soldering of suitable leads 13' thereto.

With the electrodes in place, the glass is then ready to be filmed and this can be done by first heating the sheet to approximately the softening point of the glass and then spraying the surface 14 with a solution of stannic tetrachloride to deposit a clear transparent electrically conducting layer of tin oxide 15 on the glass and in contact with the electrodes. If desired, the heating of the glass preparatory to filming can also be utilized to fuse the silver flux to the glass, thus eliminating one heating step.

The filmed sheet 11 can then be incorporated into an integral composite unit by assembling it together with a second sheet 10 and an interlayer sheet 12 into a glass-plastic sandwich, with the coated surface of the sheet 11 inside, and then laminating the several layers of the sandwich together in accordance with any of the well known laminating procedures.

When this has been done an electrically conducting laminated glass unit, which is stable and entirely satisfactory when tested in the laboratory under ambient temperature conditions, is obtained.

However, under low temperature testing, or when used in vehicles in climates or under conditions where extremely low temperatures are encountered, such units exhibit too great a percentage of electrode failures. These failures, in the greatest percentage of cases are in the form of arcing along one or the other of the electrodes when the current is applied. Such arcing, of course, results in hot areas which place the glass in severe thermal shock often resulting in glass failure, and making the units undesirable commercially.

A great deal of work has been done in attempting to overcome this difficulty by employing different types of electrodes and by modifying, treating, and redesigning the known types of electrodes. But it has been my opinion that this electrode failure was not due to defects in the electrode itself but instead that it was due, primarily, to relative movement of the laminations resulting from excessive temperature differentials within the unit and the wide difference in expansion and contraction coefficients of the glass and plastic of the laminations. And this opinion has been substantiated by subsequent tests.

Thus, it was found that some of the tested units in failure in cold room testing at temperatures down to $-50°$ F. showed large areas where glass had parted from glass. In other words, the plastic to filmed glass bond and the film to glass bond showed adhesive forces greater than the cohesive forces in the glass itself.

Now the coefficient of linear expansion in a longitudinal direction of plastic sheeting of the type used in commercial laminated safety glass is $20.3 \times 10^{-5}/°$ F. from $-58°$ F. to $+77°$ F.; and it is $38.9 \times 10^{-5}/°$ F. in the same direction between $+77°$ F. and $+122°$ F. In a transverse direction, the coefficient of linear expansion per $°$ F. is $15.7 \times 10^{-5}$ between $-58°$ F. and $+77°$ F., and $22.2 \times 10^{-5}$ between $+77°$ F. and $+122°$ F. On the other hand, the coefficient of linear expansion of the assignee company's automotive plate or color clear glass, used in windshields, is approximately $50 \times 10^{-7}/°$ F. in the above temperature ranges. Or, simply expressed, the linear expansion of the plastic is between 30 and 80 times greater than that of the glass. Consequently, a structure composed of these two well-bonded materials having such widely varying coefficients of linear expansion is comparable to bimetallic thermostat construction.

Moreover, in a unit of this character, the film 15 which carries all of the current causes the surface 14 of the glass sheet 11 to become hot while the opposite surface of the same sheet, and which is preferably exposed to the outside, remains much cooler. Deflection measurements on unlaminated electrically conducting glass under these conditions show that such temperature differentials between the opposite surfaces of the glass sheet causes a bending of the glass, with the filmed surface being on the convex side of the bend.

Of course, the filmed sheet has this same tendency to bend when in a laminated unit, however at the same time, the surface of the plastic interlayer 12 that is adjacent the film becomes hot while the other side of the plastic interlayer remains cold, and this causes a bending of the plastic layer with the convex side being adjacent to the film 15. Because of the tight bond between the filmed glass and the plastic, the tendency of the glass sheet to bend in one direction is overcome and it is actually caused to bend in the opposite direction.

In other words, when such units are used in low temperatures, a flexing of the unit takes place which has a strong tendency to cause separation of the laminations around the periphery of the unit. Especially, since the edge of the glass where the flexing stresses are found in greatest concentration are also the points of greatest weakness. Consequently, due to the excellent filmed glass-plastic bond, separation in the glass itself takes place in these areas.

In the same way, the bond between the silver flux or the filmed silver flux of the bus bar 13 and the plastic interlayer 12 has proved under test to be approximately the same as that between the plastic and the glass, and, since the linear expansion coefficient of the bus bar is comparatively close to that of the glass, the enormous stresses set up by the expansion and contraction of the plastic and filmed glass will obviously cause electrode failure. Particularly, since a very slight movement of the electrode with respect to the base glass will result in an electrode to film interface separation and cause unavoidable arcing and possible glass failure.

This confirmed my opinion that electrode failure in these units really involves two distinct problems. First, the problem of the plastic expanding over the electrode area and causing a separation of the film at the electrode-film interface (indicated at 20); and, second, the problem of glass separation at the edges of the unit due to unequal coefficient of expansion plus flexing of the unit due to unequal heating.

According to the present invention, I overcome these difficulties and avoid electrode failure in electrically conducting laminated safety glass units by placing a separator between the electrode area and the glass. In some cases, the separator may extend down over the glass edge, and in another form of the invention I apply the separator to the edges of both sheets of glass and extend it inwardly for a short distance to cover the inner marginal areas of both of the glass sheets.

To illustrate one phase of the invention, and which is best shown in Fig. 2, after the glass sheet 11 with the electrodes 13 thereon has been filmed, and before it is laminated, I apply over the area of the electrode and preferably for a short distance inwardly beyond the inside edge thereof, a separator which, in this case, is a layer of parting material 16. That is, a material which exhibits a poor bond, or practically no bond at all between itself and the bus bar material, and also little or no bond between itself and the plastic interlayer 12. There are a great many materials that are satisfactory for this purpose. For example, I have tried, among others, cellulose acetate, and untreated cellulose acetate, dissolved in various solutions, also silicone oils, stearic acid, vinyl chloride resin solutions, etc. It may also be desirable to extend the layer of parting material downwardly over at least a part of the adjacent edge of the glass as shown at 18 in Fig. 3.

After application of the parting material 16, the glass sheet 11 may be laminated with any desired number of alternate layers of glass and plastic to provide the type of laminated unit required.

The function of the separator in this case is to permit the plastic interlayer to expand and contract freely over the area of the electrode without affecting the electrode in any way and without its having any tendency to move the electrode within the unit or to pull it from the glass or out of contact with the film 15. A large number of units fabricated in this manner have been tested under extremely severe conditions without a single electrode failure.

Figure 3:
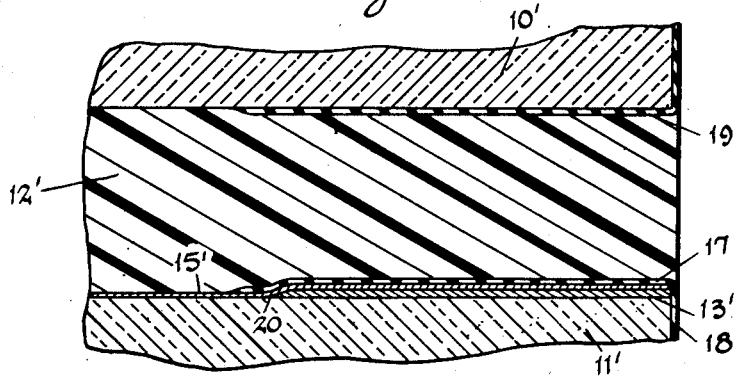
Fig. 3 is a view similar to Fig. 2, but showing a modified form of separating layer.

An alternate form of the invention is illustrated in Fig. 3 in which a different type of separator 17 is applied to the glass sheet 11' after it has been provided with an electrode 13' and an electrically conducting coating 15'. The separator 17 may be applied in a similar manner and to the same electrode area as the parting material 16 in Fig. 2.

However, in this case, the separator is a well bonded elastic material, or an adhesive having low temperature elasticity, rather than a parting material. This arrangement too, effectively prevents electrode failure, although in a somewhat different manner. Thus, if a suitably permanent elastic separator material, which will bond to the glass and to the plastic and will remain elastic at low temperatures, is placed over the electrode area at the edges of the lamination, the strength of the unit will be maintained and glass separation avoided even during bowing of the laminations due to wide temperature differentials.

A number of materials have been found to be suitable for this purpose and these include the synthetic rubber cements such as "Fairprene Rubber," and the thiokols, of which Minnesota Mining Company's EC-801 is a well known example. Other materials that have proved satisfactory are FS-621, and Minnesota Mining Company's EC-901 and EXP-83348.

As noted above, the layer of elastic material 17 may be placed in the same position and over the same area as the layer of parting material 16 in Fig. 2. However, I have found that it is desirable at least in some cases to extend the elastic material downwardly over the edge of the glass sheet as shown at 18.

It is desirable to extend the separating material downwardly over the edge of the glass sheet in this way because of the possibility of getting plastic on the glass edge during the laminating procedure. If this happens when there is no separating material on the edge the plastic will be tightly bonded to the glass edge. Consequently, when the unit cools the difference in expansion and contraction between the glass and tightly bonded plastic will cause glass to part from glass thus tearing or separating the film on the glass surface.

In addition, greater protection from edge separation can be had by placing a similar layer of elastic material 19 at the margins of the unit, between the plastic 12' and the glass sheet 10'. Likewise, the parting material 16 of Fig. 2 may be extended over the edge of the glass sheet 11, and a layer of elastic material, located as shown at 19 in Fig. 3, may be combined with the layer of parting material 16 in Fig. 2.

In fact, it is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In an electrically conducting laminated safety glass unit comprising two sheets of glass and an interposed layer of non-brittle thermoplastic material all bonded together into a unitary structure, an electrode along the margin of the inner surface of one of said glass sheets, a transparent coating of electrically conducting material also on said surface and in contact with said electrode and a layer of non-metallic separator material over the area of the electrode between said glass surface and said plastic interlayer and extending over a contiguous edge of said glass sheet.

2. In an electrically conducting laminated safety glass unit comprising two sheets of glass and an interposed layer of non-brittle thermoplastic material all bonded together into a unitary structure, an electrode along the margin of the inner surface of one of said glass sheets, a transparent coating of electrically conducting material also on said surface and in contact with said electrode, and a layer of non-metallic separator material over the area of the electrode and between said glass surface and said plastic interlayer.

3. In an electrically conducting laminated safety glass unit comprising two sheets of glass and an interposed layer of non-brittle thermoplastic material all bonded together into a unitary structure, an electrode along the margin of the inner surface of one of said glass sheets, a transparent coating of electrically conducting material also on said surface and in contact with said electrode, and a layer of non-metallic parting material over the area of the electrode and between said glass surface and said plastic interlayer.

4. In an electrically conducting laminated safety glass unit comprising two sheets of glass and an interposed layer of non-brittle thermoplastic material all bonded together into a unitary structure, an electrode along the margin of the inner surface of one of said glass sheets, a transparent coating of electrically conducting material also on said surface and in contact with said electrode, and a layer of non-metallic elastic material over the area of the electrode and between said glass surface and said plastic interlayer.

5. In an electrically conducting laminated safety glass unit comprising at least one sheet of glass having an electrode along a portion of one surface thereof and a transparent coating of electrically conducting material also on said surface in contact with said electrode and a layer of non-brittle thermoplastic material integrally bonded to the coated surface of said glass sheet, a strip of dielectric material in the form of a tape over the area of the electrode between said electrode and the plastic layer.

6. In a laminated safety glass unit comprising two sheets of glass and an interposed layer of non-brittle thermoplastic material all bonded together into a unitary structure, electrodes along opposite margins of an inner surface of one of said glass sheets, a transparent film of electrically conducting material also on said surface in contact with said electrodes and tightly bonded thereto, and a strip of elastic dielectric material in the form of a tape over the area of each of the electrodes and between said electrodes and the plastic layer.

7. In an electrically conducting laminated safety glass unit comprising at least one sheet of glass having an electrode along a margin of one surface thereof and a transparent film of electrically conducting material also on said surface in contact with said electrode and a layer of non-brittle thermoplastic material integrally bonded to the filmed surface of said glass, and a strip of elastic dielectric material in the form of a tape over the area of the electrode between said electrode and the layer of thermoplastic material and extending from said area over onto a contiguous edge of the glass sheet.

ROMEY A. GAISER.

REFERENCES CITED

The following references are of record in the file of this patent:

UNITED STATES PATENTS

| Number | Name | Date |
|---|---|---|
| 475,998 | Burnett et al. | May 31, 1892 |
| 523,305 | Criggal | July 17, 1894 |
| 794,588 | Casassa | July 11, 1905 |
| 2,021,661 | Kisfaludy | Nov. 19, 1935 |
| 2,119,680 | Long | June 7, 1938 |
| 2,198,578 | Hazelton | Apr. 23, 1940 |
| 2,222,742 | Ducret et al. | Nov. 26, 1940 |
| 2,392,129 | Downes | Jan. 1, 1946 |
| 2,429,420 | McMaster | Oct. 21, 1947 |
| 2,441,831 | Moore | May 18, 1948 |
| 2,490,433 | Gunning et al. | Dec. 6, 1949 |
| 2,497,507 | McMaster | Feb. 14, 1950 |
| 2,513,993 | Burton | July 4, 1950 |